(12) United States Patent
Nonoshita et al.

(10) Patent No.: US 7,527,277 B2
(45) Date of Patent: May 5, 2009

(54) BICYCLE CRANK

(75) Inventors: Tetsu Nonoshita, Sakai (JP); Toyoshi Yoshida, Sakai (JP); Tsukasa Fukuta, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/704,184

(22) Filed: Feb. 9, 2007

(65) Prior Publication Data
US 2007/0241530 A1    Oct. 18, 2007

(30) Foreign Application Priority Data

Apr. 14, 2006    (JP)    ............................. 2006-111687
Dec. 14, 2006    (JP)    ............................. 2006-336636

(51) Int. Cl.
*B62M 1/02*    (2006.01)
(52) U.S. Cl. ..................... 280/259; 280/281.1; 74/594.1
(58) Field of Classification Search ................. 280/259, 280/294, 281.1; 74/594.1
See application file for complete search history.

(56) References Cited

U.S. PATENT DOCUMENTS

| | | | | |
|---|---|---|---|---|
| 2,350,468 A | * | 6/1944 | Kraeft | ........................ 74/594.1 |
| 4,811,626 A | * | 3/1989 | Bezin | ........................ 74/594.1 |
| 6,508,146 B2 | * | 1/2003 | Kang et al. | ................. 74/594.3 |
| 7,263,914 B2 | * | 9/2007 | Ording et al. | ............... 74/594.1 |
| 2003/0051573 A1 | * | 3/2003 | Ording et al. | ............... 74/594.1 |
| 2003/0066383 A1 | | 4/2003 | Jiang | |
| 2005/0011304 A1 | | 1/2005 | Chiang | |
| 2006/0101940 A1 | * | 5/2006 | Okada | ........................ 74/594.1 |
| 2007/0095164 A1 | * | 5/2007 | Yamanaka et al. | ......... 74/594.1 |
| 2008/0224440 A1 | * | 9/2008 | Masuda et al. | ............... 280/259 |

FOREIGN PATENT DOCUMENTS

| EP | 1 281 609 A2 | 2/2003 |
|---|---|---|
| EP | 1 342 656 A2 | 9/2003 |
| JP | 2003-072666 | 3/2003 |
| WO | WO-2005/068284 A1 | 7/2005 |

* cited by examiner

*Primary Examiner*—Tony H. Winner
(74) *Attorney, Agent, or Firm*—Global IP Counselors, LLP

(57) ABSTRACT

A crank is provided with a crank axle connecting portion for connecting a crank axle thereto, a pedal connecting portion for connecting a pedal thereto, and a main crank portion positioned between the crank axle connecting portion and the pedal connecting portion. A first insert member is arranged in the crank axle connecting portion, and has an axle attaching part having a crank axle connecting hole and an extended part extending from the axle attaching part toward the pedal connecting portion so as to following along the main crank portion. The crank axle further includes a shell member made of a fiber-reinforced resin that at least partially covers an outside facing surface of the first insert member.

13 Claims, 10 Drawing Sheets

BICYCLE CRANK

CROSS-REFERENCE TO RELATED APPLICATIONS

This application claims priority under 35 U.S.C. § 119 to Japanese Patent Application Nos. 2006-111687, filed Apr. 14, 2006 and 2006-336636, filed Dec. 14, 2006. The entire disclosures of Japanese Patent Application Nos. 2006-111687 are hereby incorporated herein by reference.

BACKGROUND OF THE INVENTION

1. Field of the Invention

This invention generally relates to a bicycle crank. More specifically, the present invention relates to a bicycle crank having a bicycle crank arm that is non-rotatably mounted on a crank axle of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle crank.

A bicycle crank is a component for connecting a pedal to a crank axle, and is also a motion-transmitting member for transmitting pedal force from the pedal. The technological requirements of the crank include high strength in order to prevent damage or deformation despite the crank being repeatedly subjected to loads from the pedal, and high rigidity in order to prevent deformation or unpleasant sensations when the pedal is depressed. The crank must also be as lightweight as possible in order to reduce the weight of the entire bicycle.

To fulfill these requirements, cranks have been primarily made of aluminum alloys in the past. Specific known examples include high-strength aluminum alloys such as Alloy 7075, and alloys having hollowed structures in order to further reduce weight. However, there is a limit to reducing weight by means of an aluminum alloy alone. In view of this, metal crank axles have been fixed to cranks reinforced with a fiber-reinforced resin shell in the past (see U.S. Patent application Publication No. 2005/0011304). In these conventional cranks, the periphery of the aluminum crank is reinforced with a fiber-reinforced resin. A connecting hole for connecting the hollow crank axle is formed in the proximal end of the crank, and a crank axle is fixed in the connecting hole by press-fitting, for example. Therefore, the connecting hole is exposed in the portion of the crank connected to the crank axle.

Another conventional example is a crank having a hollowed structure in which a fiber-reinforced resin is used on the shell of the crank (see, for example, Japanese Laid-Open Patent Application No. 2003-72666). In a conventional bicycle crank, a fiber-reinforced resin shell covers the peripheries of the insert and the core. Specifically, fiber-reinforced resin tape is wound to form the peripheries of the insert and the core, and a crank is formed. The insert is used without any modification, but the core must be extracted from the crank after being formed, which complicates the crank manufacturing process and makes it difficult to form a precise shape.

In a configuration in which the crank is reinforced by a conventional fiber-reinforced resin, a connecting hole for press-fitting the crank axle into the proximal end of the crank is exposed to the exterior. The design of the crank is compromised when the connecting hole can be seen in the crank.

Moreover, if two shell members are joined to the insert members, a stress acting to twist the crank will act on the shell members when the pedal is depressed such that a force is transmitted through the shell members from the pedal connecting portion of the crank to the insert member of the crank axle connecting portion of the crank. Consequently, there is the possibility that a force acting to cause relative displacement between the shell members and the insert members could occur. If such a displacement force occurs, there is the possibility that the shell members and the insert member will peel apart from each other.

In cases in which the two shell members are bonded, internal pressure increases as the precision of the shapes increases. Thus, the adhesive applied to the two members may be forced to leak out when internal pressure increases. When the adhesive leaks out, bonding strength is insufficient, and the leaked adhesive adheres to the exterior, compromising the appearance.

In view of the above, it will be apparent to those skilled in the art from this disclosure that there exists a need for an improved bicycle crank. This invention addresses this need in the art as well as other needs, which will become apparent to those skilled in the art from this disclosure.

SUMMARY OF THE INVENTION

An object of the present invention is to provide a bicycle crank that is configured to prevent separation of the shell members and the insert members in a bicycle crank having shell members and insert members.

Another object of the present invention is to improve crank design in a bicycle crank to which a crank axle is fixed.

Still another object of the present invention is to provide a bicycle crank that is configured to prevent leakage of the adhesive in a bicycle crank configured by bonding two shell members.

The foregoing objects can basically be attained by providing a bicycle crank according to a first aspect of the present invention that basically comprises a crank axle connecting portion, a pedal connecting portion, a main crank portion and a first insert member. The pedal connecting portion is configured to be connected to a pedal. The main crank portion is formed between the crank axle connecting portion and the pedal connecting portion. The first insert member is arranged in the crank axle connecting portion. The first insert member includes an axle attaching part with a crank axle connecting hole extending from an inside facing surface to an outside facing surface and an extended part extending from the axle attaching part toward the pedal connecting portion along the main crank portion. The bicycle crank axle further includes a shell member made of a fiber reinforced resin at least partially covering the outside facing surface of the first insert member.

In this bicycle crank, the insert member has an extended part that extends in the direction from the axle attaching part toward the pedal connecting portion so as to follow along the main crank portion, and the shell member covers the insert member, including the axle attaching part and the extended part, from the outside. Since the shell member covering the insert member from at least the outside can cover the extended part (which extends in the direction from the axle attaching part toward the pedal connecting portion so as to follow along the main crank portion), the shell member can be bonded to the extended part. Consequently, the bonded surface area between the insert member and the shell member can be increased so as to make it more difficult for the shell member to become displaced relative to the insert member when the crank is pedaled, even if a stress acting to twist the crank develops when the force is transmitted from the pedal connecting portion to the insert member through the shell member. As a result, the shell member can be prevented in an effective manner from separating from the insert member.

A bicycle crank according to a second aspect of the present invention is the bicycle crank according to the first aspect, wherein the first insert member is further includes a plurality of arm parts that extend radially from the axle attaching part. With this bicycle crank, a right crank can be configured by attaching a front sprocket to the arm parts.

A bicycle crank according to a third aspect of the present invention is the bicycle crank according to the first or second aspect, the shell member is a preformed member such that shell member covers at least the outside facing surface of the first insert member. With this bicycle crank, since the shell member is formed in advance, two shell members with simplified shapes can be formed. Consequently, even if the shapes of the shell members are complex, the shell members can be formed separately, and further enabling the weight to be reduced and the shapes of the shell member to be formed with good precision.

A bicycle crank according to a fourth aspect of the present invention is the bicycle crank according to any one of the first to third aspects, further comprising a hollow crank axle fixedly secured in the connecting hole to form a press-fit connection therebetween with the hollow crank axle and the connecting hole being configured to be only installable into the connecting hole from the outside facing surface of the first insert member. With this bicycle crank, even though the crank axle is press fitted into the connecting hole of the insert member from the outside, the connecting hole is not exposed to the outside because it is covered by the shell member. As a result, this aspect of the invention enables the aesthetic design of even a crank having a crank axle fixed thereto to improved.

The bicycle crank according to a fifth aspect is the crank according to any one of the second to fourth aspects, further comprising a second insert member disposed in the pedal connecting portion for connecting the pedal with the second insert member having an inside facing surface and an outside facing surface, and the shell member including a first shell member covering the outside facing surfaces of the first and second insert members, and a second shell member covering the inside facing surfaces of the first and second insert members, with the first and second shell members being fixed together to forms an internal space housing the first insert member and the second insert member. In this case, the insert members are not exposed to the exterior, and the insert member and crank can both be reduced in weight because the insert member is divided into two parts and the shell member is disposed so as to cover the first and second insert members from the outer and inner sides. The precision of the shell member can also be improved because the shell member is divided into two internal and external parts and the structures thereof are simplified.

A bicycle crank according to a sixth aspect of the present invention is the bicycle crank according to any one of the second to fifth aspects, wherein the extended part of the first insert member includes a first rib extending towards the pedal connecting portion from an intermediate position of a first one of the arm parts along an upstream side of the main crank portion with respect to a rotational direction in which the bicycle crank is rotated in order to move in a forward direction when installed on a bicycle. With this bicycle crank, a first rib constituting an extended part is provided on the upstream side with respect to the rotational direction, which is the side where the largest torsional stress develops when the crank is pedaled. As a result, peeling of the shell member can be effectively suppressed by bonding the shell member to the first rib.

A bicycle crank according to a seventh aspect of the present invention is the bicycle crank according to the sixth aspect, wherein the extended part of the first insert member further includes a second rib extending towards the pedal connecting portion from an intermediate position of a second one of the arm parts along a downstream side of the main crank portion with respect to the rotational direction in which the bicycle crank is rotated in order to move in the forward direction. With this bicycle crank, the extended part comprises a pair of ribs arranged side by side with each other with respect to the rotational direction. As a result, peeling (separation) of the shell member can be effectively suppressed regardless of the direction in which the crank is rotated.

A bicycle crank according to an eighth aspect of the present invention is the bicycle crank according to the sixth or seventh aspect, wherein the first and second ribs have bonding surfaces that face in opposite directions and intersect with a circle that is centered on a rotational axis of the crank axle connecting hole. With this bicycle crank, peeling (separation) of the shell member can be effectively suppressed because a bonding surface where the shell member and the insert member are bonded together is formed so as to be oriented in such a direction as to bear more of the force that results from pedaling the crank than it would bear if oriented in any other direction.

The bicycle crank according to a ninth aspect is the crank according to any one of the fifth to eighth aspects, further comprising a communicating part communicating the internal space with an exterior area. In this case, the internal pressure in the internal space is not likely to increase. This is because when the first and second members are bonded with an adhesive, the air inside the bond escapes to the exterior through the communicating part. Therefore, the adhesive can be prevented from leaking to the exterior as a result of an increase in internal pressure.

The bicycle crank according to a tenth aspect is the crank according to any one of the fourth to ninth aspects, wherein the crank axle has a flange contacting the outside facing surface of the first insert member adjacent to the connecting hole. In this case, the ridge is in contact with the external end surface of the connecting hole, whereby the press-fitted crank axle can be easily positioned in the axial direction, the axis of the crank axle can be prevented from being tilted (misaligned) when the crank axle is press-fitted and fixed in the first insert member, and the crank axle can be fixed in the first insert member with high precision.

The bicycle crank according to an eleventh aspect that basically comprises a hollow crank axle, a first insert member, and a shell member. The hollow crank axle has a first end and a second end. The first insert member has a crank axle connecting hole extending from an inside facing surface of the first insert member to an outside facing surface of the first insert member with the first end of the crank axle being fixedly secured in the connecting hole to form a press-fit connection therebetween. The shell member is made of a fiber-reinforced resin with the shell member fixedly coupled to the first insert member and at least partially covering the outside facing surface of the first insert member.

In this bicycle crank of the eleventh aspect, the crank axle is press-fitted and fixed in the connecting hole of the insert member from the outside, and the shell member covers the outside of the insert member. The connecting hole is covered by the shell member and is not exposed to the exterior even when the crank axle is press-fitted and fixed in the connecting hole of the insert member from the outside. Therefore, the design can be improved in a crank in which a crank axle is fitted.

The bicycle crank according to a twelfth aspect comprises a first shell member, a second shell member, a first insert member, a second insert member, and a communicating part. The first shell member is made of a fiber-reinforced resin. The second shell member is attached to the first shell member with an internal space formed between the first and shell members. The first insert member is disposed in the internal space with the first insert member having a first connection structure configured to be connected to a crank axle. The second insert member is disposed in the internal space with the first insert member having a second connection structure configured to be connected to a pedal. The communicating part communicates the internal space with an exterior area.

In this bicycle crank of the twelfth aspect, the crank axle and the pedal are connected to separate insert members, and the two insert members are covered by two members, which are the first shell member and second shell member made of a fiber-reinforced resin. The internal space between the two shell members is communicated with the exterior through the communicating part. The air in the internal space is discharged through the communicating part to the exterior when the two shell members are bonded with an adhesive, because the internal space, which is closed up by the two shell members, is communicated with the exterior through the communicating part. Therefore, the internal pressure in the internal space does not increase. The internal pressure in the internal space also does not increase during bonding, because a communicating part is provided to communicate the internal space between the two insert members with the exterior. Therefore, the adhesive can be prevented from leaking to the exterior as a result of an increase in internal pressure.

According to the present invention, the shell member covers an extended part that extends toward the pedal connecting portion so as to following along the main crank portion. Thus, the shell member can be bonded to the extended part and the bonded surface area between the insert member and the shell member can be increased. Consequently, it is more difficult for the shell member to become displaced relative to the insert member when the crank is pedaled, even if a stress acting to twist the crank develops when the force is transmitted from the pedal connecting portion to the insert member through the shell member. As a result, the shell member can be prevented in an effective manner from separating from the insert member.

According to another aspect of the present invention, the connecting hole is covered by the shell member and is not exposed to the exterior even when the crank axle is press-fitted and fixed in the connecting hole of the insert member from the outside. Therefore, the design can be improved in a crank in which a crank axle is fitted.

According to yet another aspect of the present invention, the internal pressure in the internal space is not likely to increase during bonding, because a communicating part is provided to communicate the internal space between the two shell members with the exterior. Therefore, the adhesive can be prevented from leaking to the exterior as a result of an increase in internal pressure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
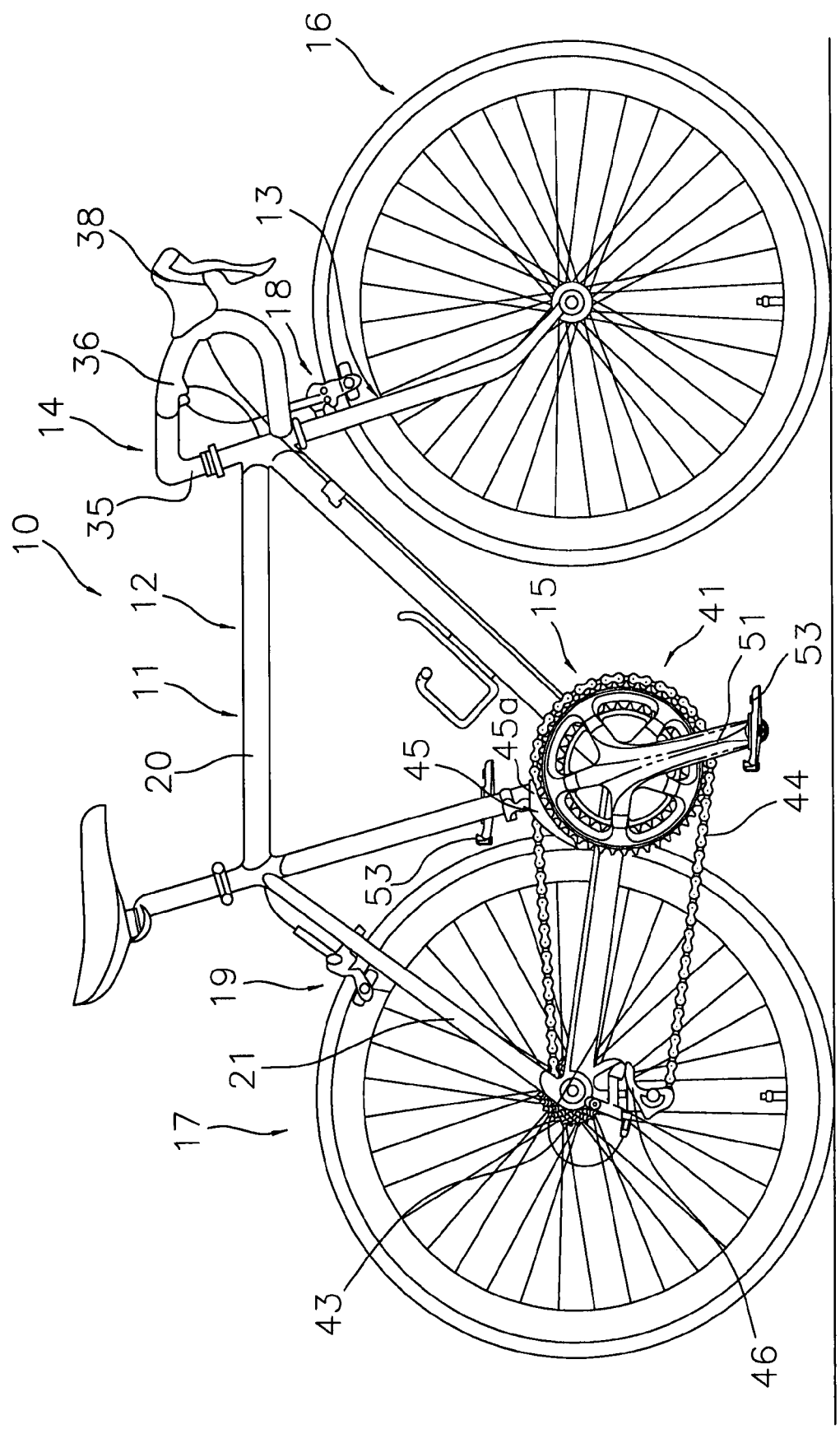
FIG. 1 is a right side elevational view of a bicycle with a bicycle crank axle assembly in accordance with one embodiment of the present invention.

Referring initially to FIG. 1, a bicycle 10 is illustrated in accordance with a first embodiment of the present invention. As seen in FIG. 1, the bicycle 10 is a "road racer" (racing style road bike) that has a diamond-shaped frame 11 that serves as the framework of the bicycle. The frame 11 has a frame body 12 and a front fork 13 attached thereto. The bicycle 10 also has a drop-type handlebar unit 14 attached to the front fork 13. The front fork 13 is supported on a front part of the frame 12 such that it can rotate freely about an axis that is tilted slightly from vertical. The lower part of the front fork 13 is divided into two prongs. The bicycle 10 also has a drive unit or drive train 15, a front wheel 16, a rear wheel 17 and front and rear brake devices 18 and 19. The drive train 15 is configured to convert the rider's pedaling force into driving force. The front wheel 16 is supported in a freely rotatable manner on the bottom end of the front fork 13. The rear wheel 17 is supported in a freely rotatable manner on a rear part of the frame body 12. The bicycle 10 is also provided with a pair (front and rear) of brake devices 18 and 19.

As seen in FIG. 1, the frame body 12 has a triangularly shaped main or front triangle 20 and a triangularly shaped rear triangle 21 that is arranged rearward of the front triangle 20. The front triangle 20 is formed by a top tube, a down tube, head tube and a seat tube. The frame body 12 also has a cylindrical hanger 29.

The handlebar unit 14 includes a handlebar stem 35 and a handlebar 36. The handlebar stem 35 of the handlebar unit 14 is fastened to the upper part of the front fork 13 in such a manner that it can be vertically moved up and down. The handlebar 36 is fixed at a horizontally extending center portion on a top edge of the handle stem 35 with both free ends having curved portions extending from the center portion. A brake lever 38 provided with a gear shifting capability is mounted on both ends of the handlebar 36.

The drive unit 15 basically includes a front crank unit 41, a rear gear cassette unit 43, a chain 44, a front derailleur 45, and a rear derailleur 46. The front crank unit 41 is provided on the cylindrical hanger 29 of the bicycle 10. The rear gear cassette unit 43 is mounted in a non-rotatable manner to the free hub of the rear wheel 17. The chain 44 is arranged on the front crank unit 41 and the rear gear cassette unit 43 so as to span therebetween. The front derailleur 45 and the rear derailleur 46 function as gear changing devices. The front derailleur 45 has a chain guide 45a where the chain 44 is inserted.

Figure 2:
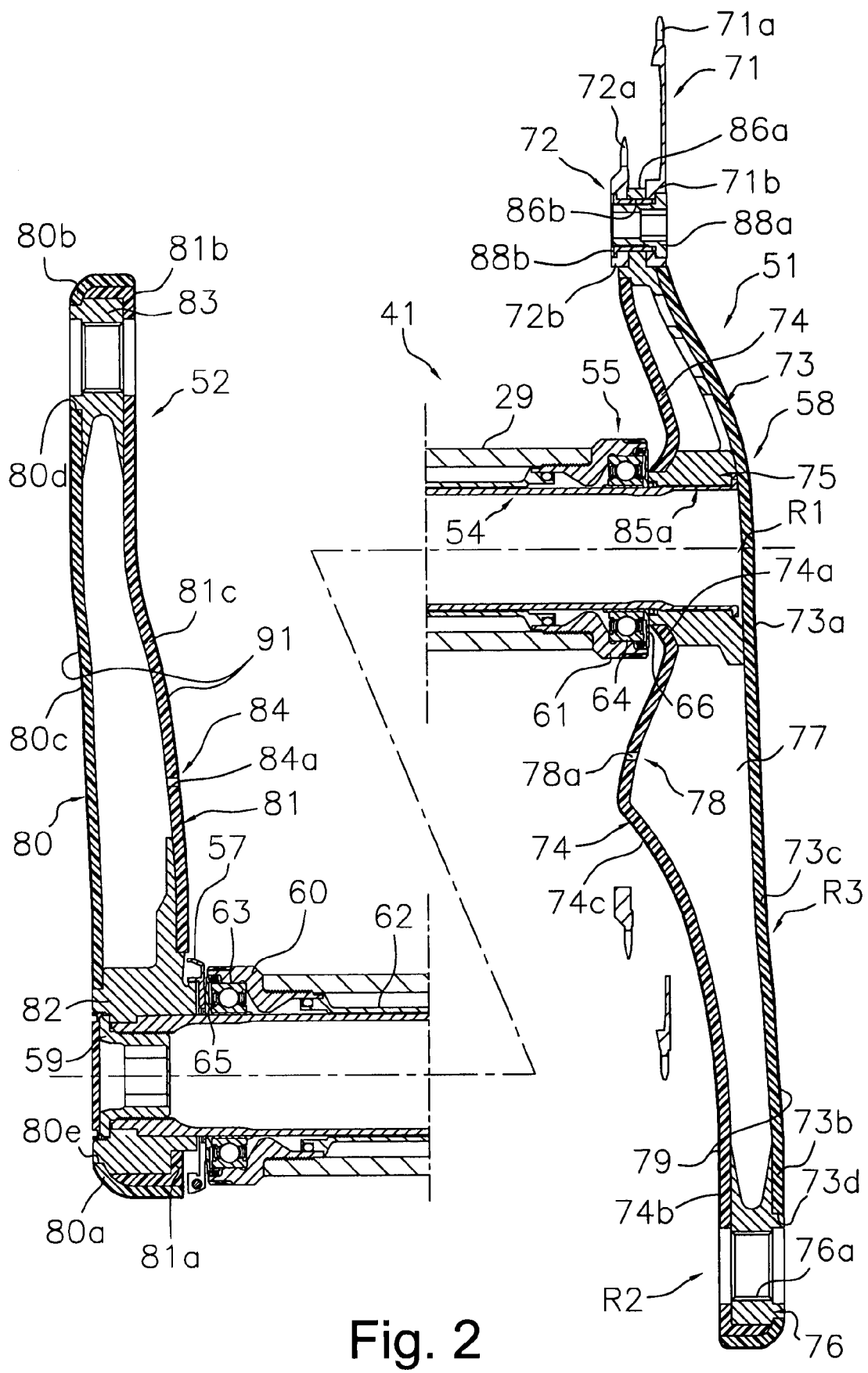
FIG. 2 is a transverse cross sectional view of the bicycle crank axle assembly including a sprocket in accordance with the illustrated embodiment of the present invention.

As shown in FIGS. 1 and 2, the crank unit 41 has a right crank 51, a left crank 52, a pair of pedals 53, a crank axle 54 and a bottom bracket 55. The bottom bracket 55 is mounted on the hanger 29 with the crank axle 54 is rotatably supported in the cylindrical hanger 29 of the frame body 12 by the bottom bracket 55. The right crank 51 is integrally fixed to the right end of the crank axle 54 with one of the pedals 53 (FIG. 1) mounted on the distal end. The left crank 52 is detachably fixed to the left end of the crank axle 54 with the other of the pedals 53 (FIG. 1) mounted on the distal end.

Figure 3:
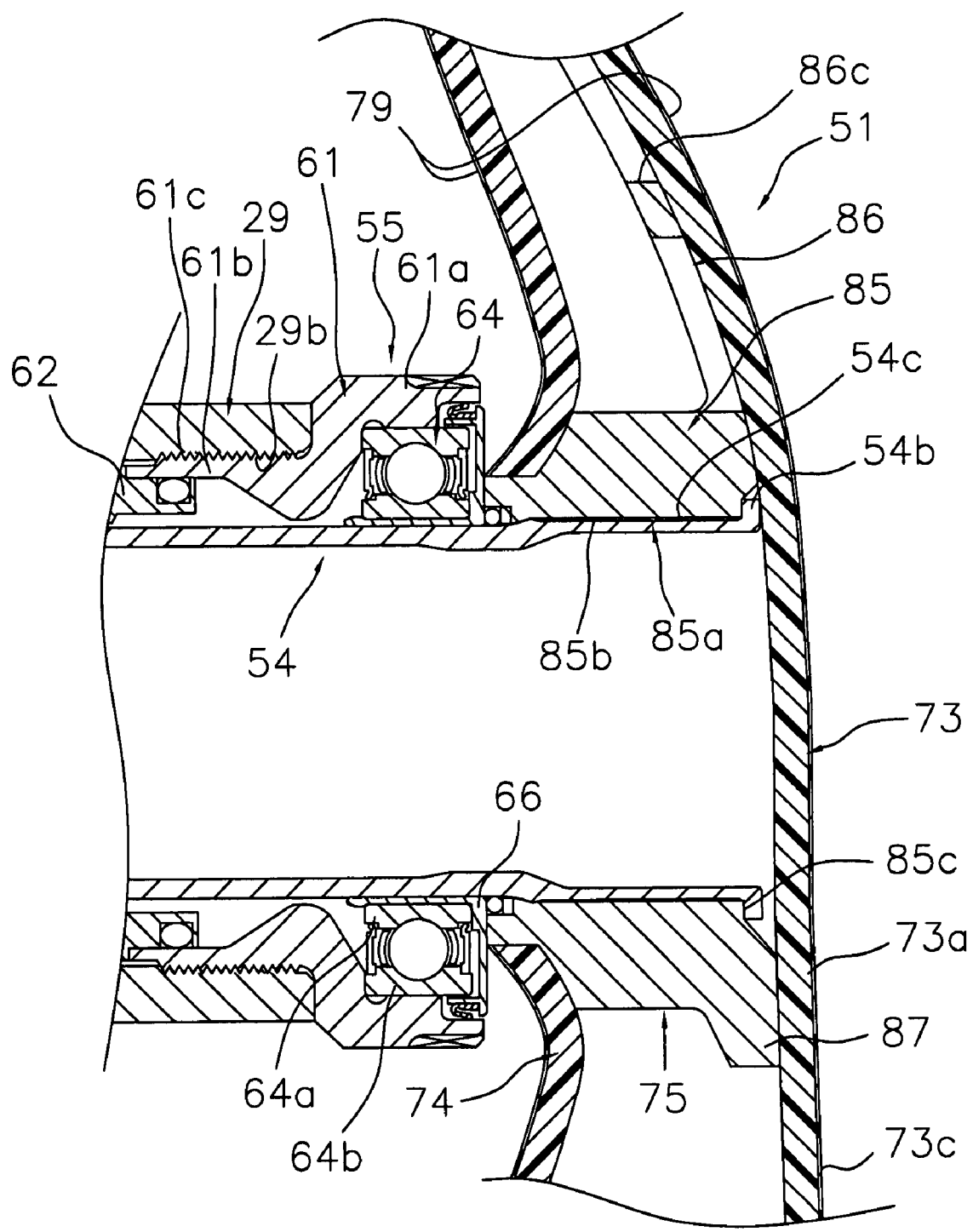
FIG. 3 is an enlarged partial cross sectional view of a right side portion of the bicycle crank axle assembly, which shows the mounting of the right crank arm to the crank axle.

The crank axle 54 is preferably a hollow pipe-shaped member made of chrome-molybdenum steel or another such highly rigid alloy, for example. As shown in FIG. 3, the right end of the crank axle 54 is fixed to the crank axle 54 by press-fitting, for example, from the outside (right side in FIG. 2). In particular, as seen in FIGS. 3 and 4, the crank axle 54 has an internal thread 54a on its left end (FIG. 4), an enlarged flange 54b on its right end (FIG. 3), a press-fitting part 54c on its right end (FIG. 3), a tapered part 54d on its left end (FIG. 4), a first tapered surface 54e on its left end (FIG. 4) and a plurality of first splines 54f on its left end (FIG. 4).

The enlarged flange 54b contacts an external surface of an insert member of the right crank 51 to retain the right crank 51 on the crank axle 54. The press-fitting part 54c is formed on the inside (left side in FIG. 3) of the flange 54b. The press-fitting part 54c has a plurality axially extending ridges and grooves (i.e. a plurality of splines) that are press-fitted into a first connecting hole 85a formed in the right crank 51. Thus, the press-fitting part 54c has a slightly larger diameter than the inside diameter of the first connecting hole 85a to from a press fit connection therebetween.

Figure 4:
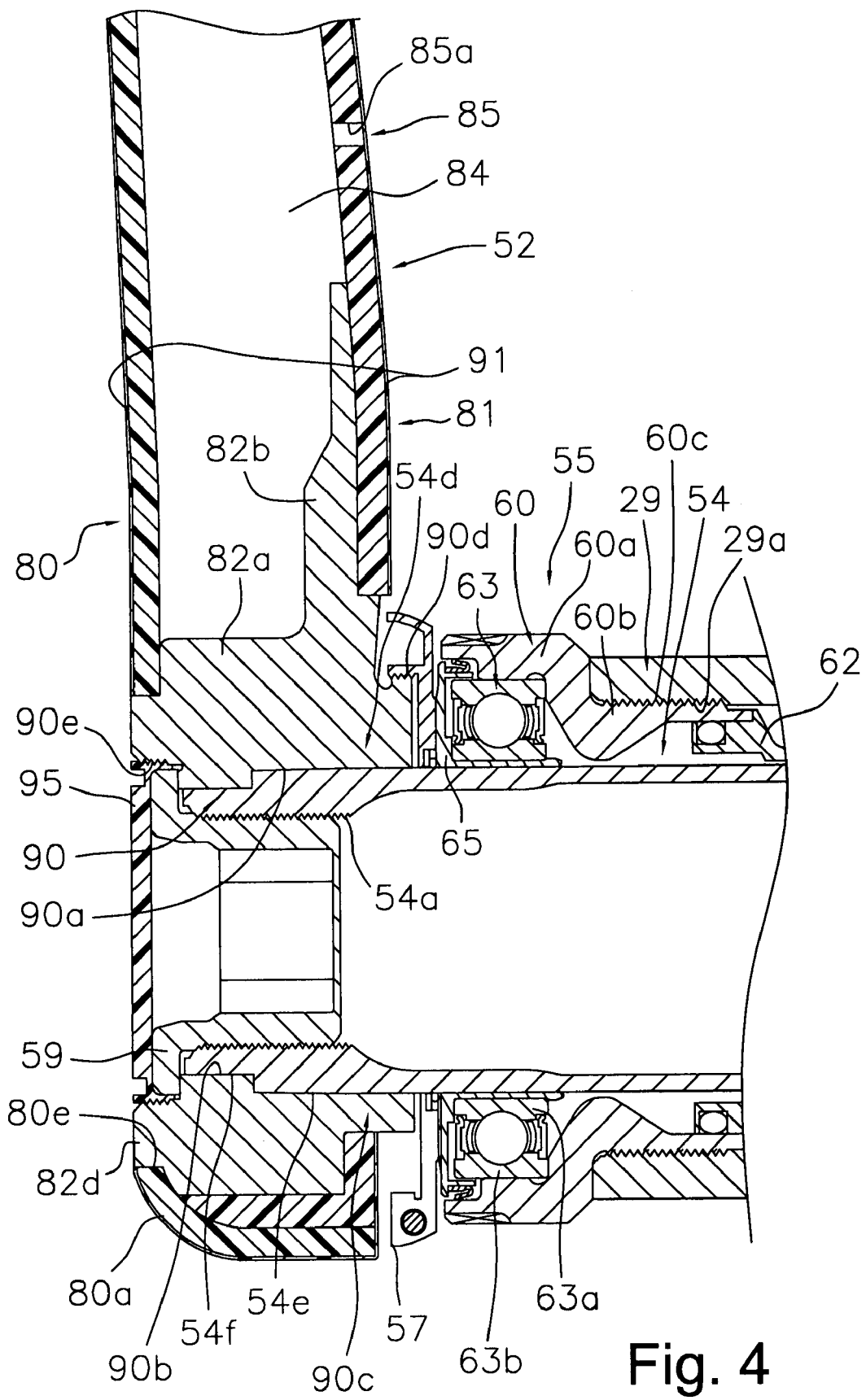
FIG. 4 is an enlarged partial cross sectional view of a left side portion of the bicycle crank axle assembly, which shows the mounting of the left crank arm to the crank axle.

The internal thread 54a is formed in the internal peripheral surface at the left end of the crank axle 54 for threadedly fastening a bolt 59 to retain the left crank 52 on the left end of the crank axle 54, as shown in FIG. 4. The tapered part 54d is formed in the external peripheral surface at the left end of the crank axle 54 for non-rotatably connecting the left crank 52. The tapered part 54d has the first tapered surface 54e formed thereon in a tapered shape. The first splines 54f are formed as radially inward recessions in at least part of the first tapered surface 54e, i.e., in the external peripheral surface at the distal end, and that non-rotatably connect the left crank 52 on the left end of the crank axle 54. The first tapered surface 54e is a tapered surface having an angle of inclination of about 0.5 to 1.5 degrees, for example.

The bottom bracket 55 has left and right bearing housings 60 and 61, a cylindrical connecting member 62, left and right bearings 63 and 64 and left and right cover members 65 and 66, as shown in FIGS. 2 through 4. The left and right bearing housings 60 and 61 are threaded into the ends of the hanger 29. The cylindrical connecting member 62 concentrically connects the left and right bearing housings 60 and 61. The left and right bearings 63 and 64 are mounted in the left and right bearing housings 60 and 61. The left and right cover members 65 and 66 are mounted between the crank axle 54 and the inner rings of the left and right bearings 63 and 64. The connecting member 62 is a cylindrical member having an inside diameter that allows the crank axle 54 to pass through.

The left and right bearing housings 60 and 61 are stepped cylindrical members. The left bearing housing 60 includes a bearing-accommodating part 60a and a mounting part 60b. The bearing-accommodating part 60a separately accommodates the left bearing 63. The mounting part 60b is aligned with the bearing-accommodating part 60a and is non-rotatably mounted to one end of the hanger 29. The right bearing housing 61 includes a bearing-accommodating 61 a and a mounting part 61b. The bearing-accommodating part 61a separately accommodates the right bearing 64. The mounting part 61b is aligned with the bearing-accommodating part 61a and is non-rotatably mounted to the other end of the hanger 29. The bearing-accommodating parts 60a and 61a are disposed on the axially external sides of the bearing-mounting parts 60b and 61b, and are larger in diameter than the mounting parts 60b and 61b. The hanger 29 has internal threads 29a and 29b in the internal peripheral surfaces at the left and right ends. The mounting parts 60b and 61b have external threads 60c and 61c that are disposed on the insides of the bearing-accommodating parts 60a and 61a. The mounting parts 60b and 61b are screwed into the internal threads 29a and 29b. Usually, the left internal thread 29a is the right thread, and the right internal thread is the left thread in order to prevent the crank from rotating and coming loose. Therefore, the external thread 60c is the right screw, and the external thread 61c is the left screw.

In the bearings 63 and 64 are ball bearings or other roll bearings having inner rings 63a and 64a and outer rings 63b and 64b. The bearings 63 and 64 are arranged so that movement of the inner rings 63a and 64a outward in the axial direction (the bearing 63 to the left in FIG. 4, and the bearing 64 to the right in FIG. 3) is restricted by the left and right cranks 52 and 51 via the cover members 65, 66, respectively. The bearings 63 and 64 are also arranged so that that movement of the outer rings 63b and 64b inward in the axial direction (the bearing 63 to the right in FIG. 4, and the bearing 64 to the left in FIG. 3) is restricted by the bearing housings 60 and 61, respectively. The bearings 63 and 64 are sealed bearings in which seals are placed between the inner rings 63a and 64a and the outer rings 63b and 64b, and grease is applied in advance. The need is thereby eliminated for performing maintenance in order to provide lubrication. Thus, placing the bearings 63 and 64 on the axially outer sides of the hanger 29 makes it possible to increase the diameter of the crank axle 54, and high strength and rigidity can be maintained in the crank axle 54 even if the crank axle 54 is given a hollow shape to reduce weight.

The cover members 65 and 66 are made of a hard synthetic resin, e.g., to cover the outer end surfaces of the bearing housings 60 and 61. The cover members 65 and 66 are enclosed between the left and right cranks 52 and 51 and the inner rings 63a and 64a of the bearings 63 and 64.

Figure 5:
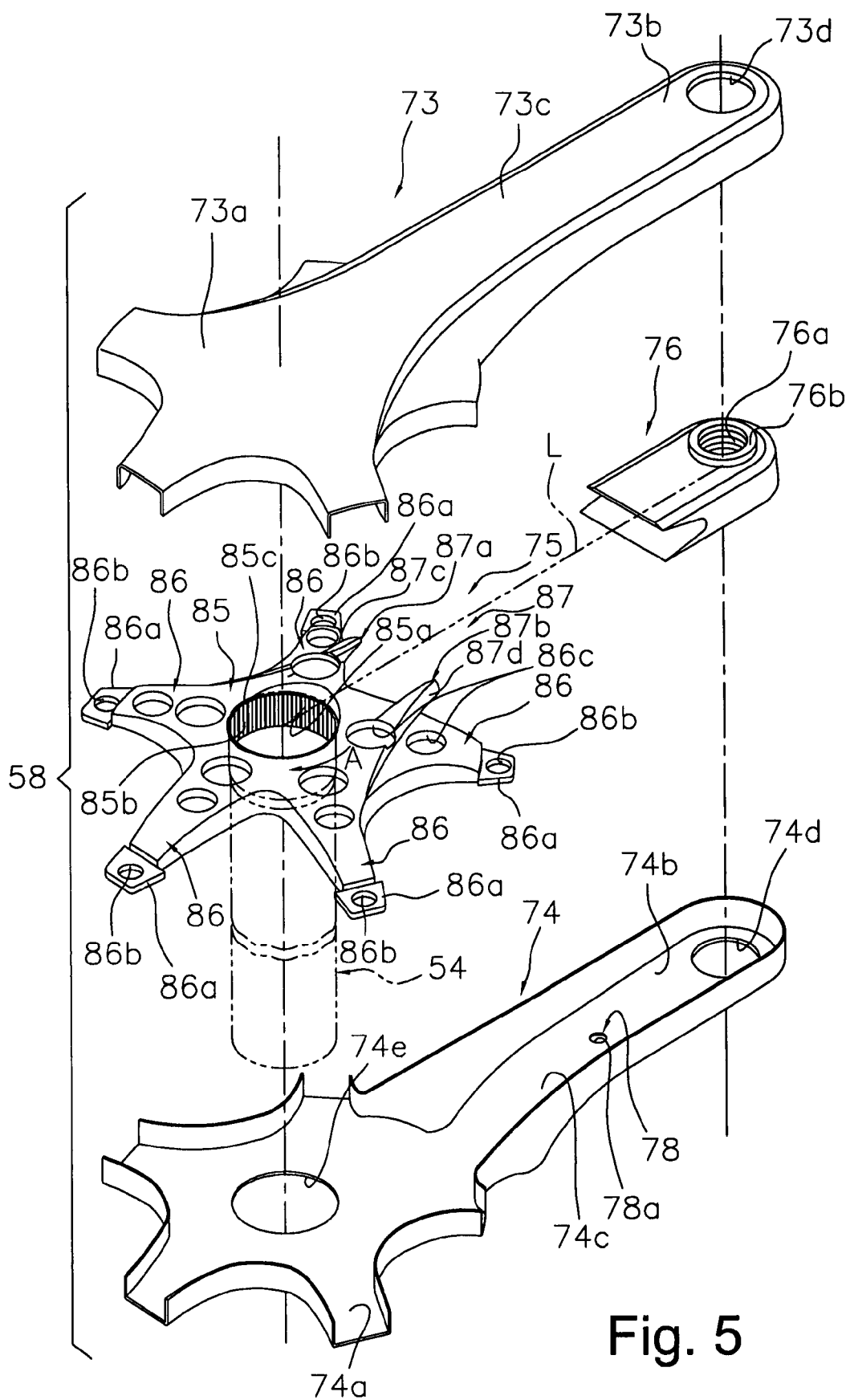
FIG. 5 is an exploded perspective view of the right crank arm illustrated in FIG. 2.

The right crank 51 has two sprockets 71 and 72, and a gear crank arm 58 to which the sprockets 71 and 72 can be fixed by a fixing bolt 59, as shown in FIGS. 2, 3, and 5. As shown in FIG. 2, the gear crank arm 58 has a crank axle connecting portion R1 to which the crank axle 54 can be mounted, a pedal connecting portion R2 to which the pedal 63 can be mounted, and a main crank portion R3 that is positioned between the crank axle connecting portion R1 and the pedal connecting portion R3. The gear crank arm 58 has a first shell member 73, a second shell member 74, a first insert member 75 and a second insert member 76. The first shell member 73 is made of a fiber-reinforced resin, preferably a carbon fiber-reinforced resin. The second shell member 74 is made of a fiber-reinforced resin, preferably a carbon fiber-reinforced resin, bonded to the first shell member 73 so that an internal space 77 is formed between the first shell member 73 and the second shell member 74. The first insert member 75 is disposed in the internal space 77 for connecting the crank axle 54 thereto. The second insert member 76 is disposed in the internal space 77 for connecting one of the pedals 53 thereto. A communicating part 78 is provided in the main crank portion R3 so that the internal space 77 communicates the internal space 77 with the exterior.

As shown in FIG. 5, the first insert member 75 is a substantially starfish-shaped member made of an aluminum alloy, magnesium alloy, titanium alloy, or other light metal, preferably an aluminum alloy whose surface is provided with an alumite finish. The first insert member 75 is disposed at the proximal end of the gear crank arm 58. The first insert member 75 functions as a spider arm of the gear crank arm 58. The first insert member 75 has an axle-attaching part 85 disposed in the center, five arm parts 86 extending radially in five directions from the axle-attaching part 85, and an extended part 87 that extends from the crank axle connecting portion R1 toward the pedal connecting portion R2, as shown in FIG. 5.

The first connecting hole 85a is formed in the center of the axle-attaching part 85 for fastening the crank axle 54 by press-fitting. Serrations 85b are formed in the internal peripheral surface of the first connecting hole 85a for securing the crank axle 54. A flat annular contact surface 85c is formed in the outer end surface of the first connecting hole 85a. The flange 54b of the crank axle 54 contacts this annular contact surface 85c. This contact between the flange 54b and the contact surface 85c allows the crank axle 54 to be easily positioned in the axial direction when the crank axle 54 is fixed by press-fitting. This contact also makes it possible to prevent the axis of the crank axle 54 from being tilted when the crank axle is fixed by press-fitting in the axle-attaching part 85 of the first insert member 75, and to fasten the crank axle 54 to the first insert member 75 with high precision.

Sprocket attachment parts 86a are formed at the distal ends of the five arm parts 86 for fastening the sprockets 71 and 72. The sprocket attachment parts 86a are machined into plate shapes. The larger sprocket 71 is aligned with the external surface (right side surface in FIG. 2). The smaller sprocket 72 is aligned with the inner surface (left side surface in FIG. 2). Bolt insertion holes 86b are formed in the sprocket attachment parts 86a. Attachment bolts 88a and attachment nuts 88b are inserted through the bolt insertion holes 86b to fasten the sprockets 71 and 72 by conventional methods. Perforated holes 86c are also formed from the axle-attaching part 85 to the arm parts 86 for weight reduction. FIG. 5 does not show an accurate number or shape of the perforated holes 86c.

The extended part 87 is preferably configured to extend from between two arm parts 86 toward the second insert member 76, i.e., in the direction from the crank axle connecting portion R1 toward the pedal connecting portion R2 so as to follow along the main crank portion R3. The extended part 87 serves as a crank reinforcing part 87 that reinforces an inside surface of the first shell member 73. More specifically, the extended part 87 has a first rib 87a and a second rib 87b arranged between two arm parts 86 so as to be side by side with respect to the rotational direction of the gear crank arm 58. The first rib 87a is arranged in an intermediate position of the arm part 86 located on the upstream side with respect to the rotational direction in which the gear crank arm 58 is rotated in order to move the bicycle forward (i.e., the rotational direction indicated with the arrow A in FIG. 5). The second rib 87b is arranged in an intermediate position of the arm part 86 located on the downstream side with respect to said rotational direction. The first rib 87a is arranged to the left (i.e., to the left from the perspective of FIG. 5) of an imaginary line segment L indicated as a double-dot chain line in FIG. 5. The second rib 87b is located to the right of the imaginary line segment L. The imaginary line segment L joins the centers of the first connecting hole 85a and the second connecting hole 76a (described later). The first rib 87a has a bonding surface 87c, while the second rib 87b has a bonding surface 87d. Both bonding surface 87c and 87d intersect the rotational direction.

The second insert member 76 is made of the same material as the first insert member 75. The second insert member 76 has a plate shape that is rounded at one end. The second insert member 76 is disposed at the distal end of the gear crank arm 58. The second insert member 76 has a second connecting hole 76a into which the pedal axle (not shown) of the pedal 53 is screwed. An annular protrusion 76b is formed in the periphery of the second connecting hole 76a in the external side of the second insert member 76, and the protrusion 76b is exposed to the outside.

The first shell member 73 forms the external surface of the gear crank arm 58. The first shell member 73 is a member that covers the first and second insert members 75 and 76 from the outside surface. The first shell member 73 has a first cover part 73a for covering the outside of the first insert member 75, a second cover part 73b for covering the outside of the second insert member 76, and an intermediate cover part 73c disposed between the two insert members 75 and 76. The first cover part 73a is configured three-dimensionally so as to entirely cover the externally facing surface of the first insert member 75, except for the sprocket attachment parts 86a. The first cover part 73a is further configured three-dimensionally so as to entirely cover the periphery of the first insert member 75, except for the peripheral side of the first insert member 75 facing the intermediate cover part 73c. The second cover part 73b is configured three-dimensionally so as to entirely cover the externally facing surface of the second insert member 76, except for the protrusion 76b. The second cover part 73b is further configured three-dimensionally so as to entirely cover the periphery of the second insert member 76, except for the peripheral side of the second insert member 76 facing the intermediate cover part 73c. A through-hole 73d is formed in the second cover part 73b for exposing the protrusion 76b. The intermediate cover part 73c is formed integrally so as to allow the first and second cover parts 73a and 73b to be smoothly connected.

The second shell member 74 forms the inner surface of the gear crank arm 58. The second shell member 74 covers the first and second insert members 75 and 76 from the inside. The second shell member 74 has a first cover part 74a for covering the inside of the first insert member 75, a second cover part 74b for covering the inside of the second insert member 76, and an intermediate cover part 74c disposed between the two insert members 75 and 76. The first cover part 74a is configured three-dimensionally so as to entirely cover the externally facing surface of the first insert member 75, except for the sprocket attachment parts 86a. The first cover part 74a is configured three-dimensionally so as to entirely cover the periphery of the first insert member 75, except for the peripheral side of the first insert member 75 facing the intermediate cover part 74c. A through-hole 74e is formed in the center of the first cover part 74a to allow the crank axle 54 to be inserted. The second cover part 74b is configured three-dimensionally so as to entirely cover the externally facing surface of the second insert member 76, except for the periphery of the second connecting hole 76a. The second cover part 74b is further configured three-dimensionally so as to entirely cover the periphery of the second insert member 76, except for the peripheral side facing the intermediate cover part 74c. The second cover part 74b has a through-hole 74d formed for inserting an Allen key or another such tool when attaching or removing the pedal 53. The intermediate cover part 74c is formed integrally so as to allow the first and second cover parts 74a and 74b to be smoothly connected. The intermediate part of the intermediate cover part 74c is formed to protrude inward as shown in FIG. 2, in order to prevent increases in internal pressure and to improve strength.

The communicating part 78 is configured from a vent hole (one example of a ventilation part) 78a that is not visible from the outside and that is provided in the intermediate cover part 74c of the second shell member 74 in the present embodiment. The vent hole 78a can be formed in advance, and can be formed by metal forming and then machining.

Figure 7:
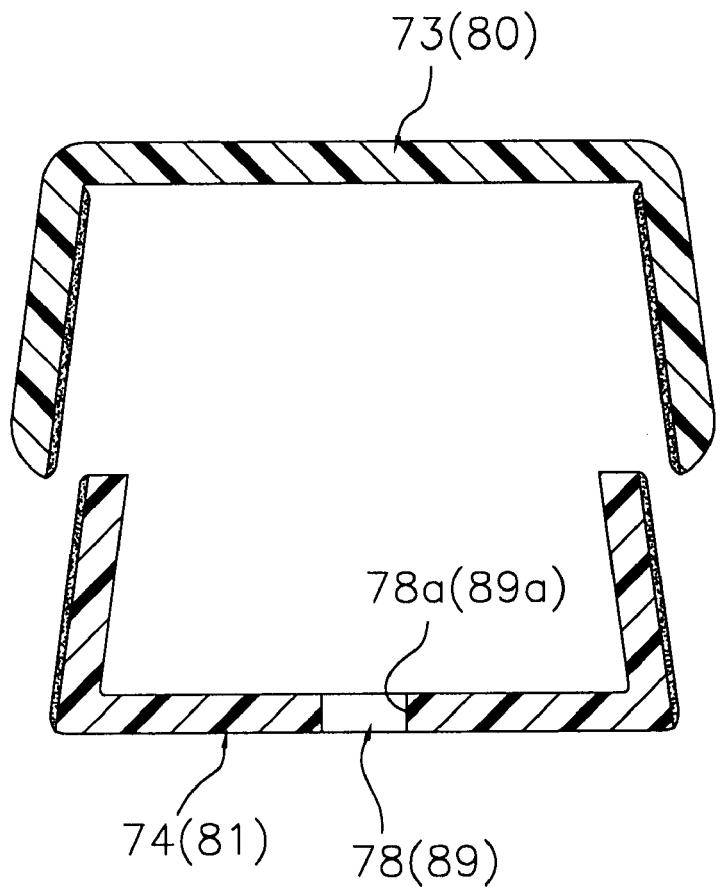
FIG. 7 is a schematic cross-sectional view of the crank arms illustrated in FIG. 2 before bonding the shell members together.

The first and second shell members 73 and 74 are formed as shown in FIGS. 5 and 7, respectively, by cutting a prepreg made of carbon fiber into the desired shape, and then using a metal die split into the desired shape to hot-form the prepreg so that the prepreg bends into a U shape in cross section.

Figure 8:
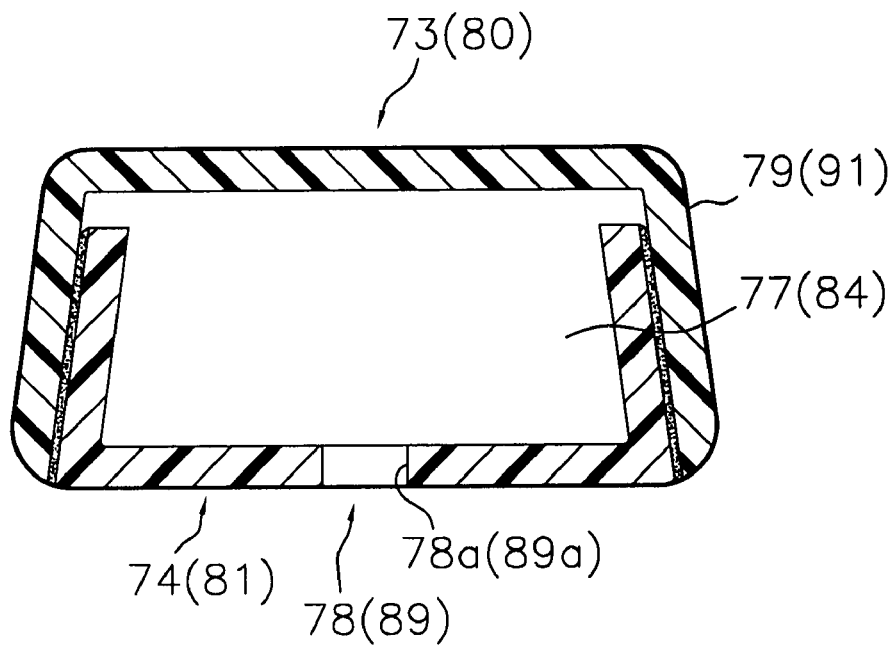
FIG. 8 is a schematic cross-sectional view of the crank arms illustrated in FIG. 2 after bonding the shell members together.

When the gear crank arm 58 is formed, the crank axle 54 is first fixed in the first connecting hole 85a by press-fitting from the outside of the first insert member 75 until the flange 54b comes into contact with the annular contact surface 85c. The first and second insert members 75 and 76 are then brought to the desired position on the second shell member 74 and fixed in place with an adhesive or the like. The internal peripheral surface of the first shell member 73 and the external peripheral surface of the second shell member 74 are then coated with an epoxy-based thermosetting adhesive, for example, as shown in FIG. 7. Then, the members are inserted into a metal die. The two members are then pressure-bonded and heated, forming the gear crank arm 58 as shown in FIG. 8. The internal pressure of the internal space 77 does not increase during the pressure bonding because the air in the internal space 77 escapes through the vent hole 78a. As a result, the adhesive can be prevented from leaking to the exterior as a result of an increase in internal pressure. A suitable number of prepregs are then heat-bonded alternately between the external surface and the inner surface of the gear crank arm 58 formed into the desired shape. These prepregs constitute a sheet-shaped surface member 79 cut into the desired shape in advance, the purpose of which is to decorate and to reinforce. A surface member 79 having an improved design thereby covers the gear crank arm 58, and the vent hole 78a is closed off. The surface member 79 is formed over the entire surface of the gear crank arm 58 except for the sprocket attachment parts 86a, as shown in FIGS. 2, 3, and 8. The through-hole 73d of the first shell member 73 and the through-holes 74d, 74e of the second shell member remain open.

The sprockets 71 and 72 are annular members made of an aluminum alloy, stainless steel alloy, or titanium alloy, and an aluminum alloy is used in the present embodiment. Gear teeth 71a and 72a that mesh with the chain 44 are formed in the external peripheries of the sprockets 71 and 72, and five crank mounting parts 71b, 72b that connect with the sprocket attachment parts 86a of the gear crank arm 58 are formed in the inner periphery, as shown in FIG. 2. The sprockets 71 and 72 are fixed to the five sprocket attachment parts 86a by the bolt members 88a and the attachment nuts 88b, as previously described.

Figure 6:
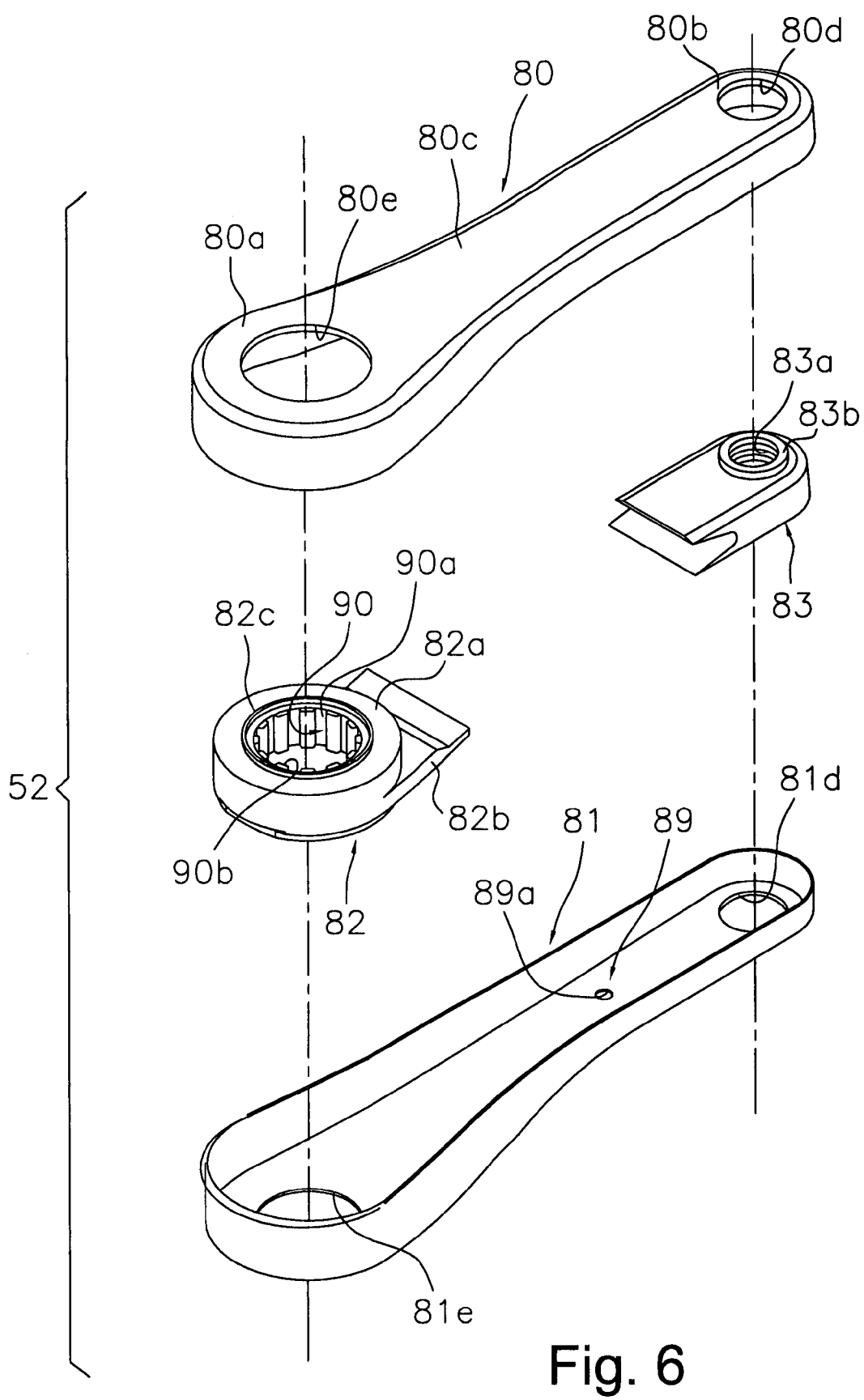
FIG. 6 is an exploded perspective view of the left crank arm illustrated in FIG. 2.

The left crank 52 is a long, thin, rod-shaped member fixed to the left end of the crank axle 54 by the fixing bolt 59 threaded into the internal thread 54a, as shown in FIG. 4. As shown in FIGS. 2, 4, and 6, the left crank 52 has a first shell member 80, a second shell member 81, a first insert member 82 and a second insert member 83. The first shell member 80 is made of a fiber-reinforced resin, preferably a carbon fiber-reinforced resin. The second shell member 81 is also made of a fiber-reinforced resin, preferably a carbon fiber-reinforced resin, and bonded to the first shell member 80 so that an internal space 84 is formed between the first shell member 80 and the second shell member 81. The first insert member 82 is disposed in the internal space 84 for connecting the crank axle 54 thereto. The second insert member 83 is disposed in the internal space 84 for connecting one of the pedals 53 thereto. A communicating part 89 communicates the internal space 84 with the exterior. The left crank 52 also has an adjustment member 57 for adjusting ball contact in the bearings 63 and 64. The adjustment member 57 is disposed between the left crank 52 and a cover member 65 of the bearing 63.

The first insert member 82 is a substantially cylindrical member made of a light metal such as an aluminum alloy, magnesium alloy, or titanium alloy, preferably an aluminum alloy whose surface is provided with an alumite finish, as shown in FIG. 6. The first insert member 82 has an axle mounting part 82a disposed in the center to mount the crank axle 54, and a plate-shaped crank reinforcing part 82b extending from the axle mounting part 82a, as shown in FIG. 6.

A first connecting hole 90 is formed in the center of the axle mounting part 82a. The first connecting hole 90 connects with the left end of the crank axle 54 in FIG. 2. The first connecting hole 90 is a tapered hole that engages with the tapered part 54d. The first connecting hole 90 has a second tapered surface 90a, a plurality of second splines 90b, a protrusion 90c, an external thread 90d and an internal thread 90e. The second tapered surface 90a engages the first tapered surface 54e. The second splines 90b are formed by recessing the second tapered surface 90a radially inward. The second splines 90b non-rotatably connect with the first splines 54f. The second tapered surface 90a has an angle of inclination of about 0.5 to 1.5 degrees, for example. The tapered surfaces 54e and 90a are provided to allow the left crank 52 to cut into and to be firmly connected to the crank axle 54 by means of the wedge effect. Therefore, the left crank 52 is not likely to come loose even if the fixing bolt 59 is removed after the two members are fixed together using the fixing bolt 59. A specialized removing tool (not shown) is needed to remove the left crank 52. An annular protrusion 82c is formed in the periphery of the external surface of the first connecting hole 90. The protrusion 90c protrudes toward the cover member 65. The protrusion 90c is formed in the surface of the axle mounting part 82a facing the bearing 63. The external thread 90d is formed in the external peripheral surface of the protrusion 90c for attaching the adjustment member 57, as shown in FIG. 4. The internal thread 90e is formed in the internal peripheral surface on the axial outer side of the first connecting hole 90. A seal member 95 is threadedly engaged with the internal thread 90e. The seal member 95 is disposed on the axial outer side of the fixing bolt 59. The seal member 95 covers the first connecting hole 90.

The crank reinforcing part 82b has a plate shape that extends towards the second insert member 83 and that reinforces the inner surface of the second shell member 81.

The second insert member 83 has the same shape as the second insert member 76 of the gear crank arm 58. The second insert member 83 also has a second connecting hole 83a and a protrusion 83b. A detailed description of the second insert member 83 is omitted because the second insert member 83 is identical to the second insert member 76.

The first shell member 80 forms the external surface of the left crank 52. The first shell member 80 is a member that covers the first and second insert members 82 and 83 from the outside. The first shell member 80 has a first cover part 80a for covering the first insert member 82, a second cover part 80b for covering the second insert member 83, and an intermediate cover part 80c disposed between the two insert members 82 and 83. The first cover part 80a is configured three-dimensionally so as to entirely cover the periphery of the first insert member 82, except for the peripheral side facing the intermediate cover part 80c. A through-hole 80e is formed in the first cover part 80a for exposing the annular protrusion 82c. The second cover part 80b is configured three-dimensionally so as to entirely cover the externally facing surface of the second insert member 83, except for the protrusion 83b. The second cover part 80b is further configured three-dimensionally so as to entirely cover the periphery of the second insert member 83, except for the peripheral side facing the intermediate cover part 80c. A through-hole 80d is formed in the second cover part 80b for exposing the protrusion 83b. The intermediate cover part 80c is formed integrally so as to allow the first and second cover parts 80a, 80b to be smoothly connected.

The second shell member 81 forms the inner surface of the left crank 52. The second shell member 81 is a member that covers the first and second insert members 82 and 83 from the inside. The second shell member 81 has a first cover part 81a for covering the first insert member 82, a second cover part 81b for covering the second insert member 83, and an intermediate cover part 81c disposed between the two insert members 82 and 83. The first cover part 81a is configured three-dimensionally so as to entirely cover the periphery of the first insert member 82, except for the peripheral side facing the intermediate cover part 81c. A through-hole 81e is formed in the first cover part 81a for exposing the first insert member 82. The second cover part 81b is configured three-dimensionally so as to entirely cover the external surface of the second insert member 83, except for the periphery of the second connecting hole 83a. The second cover part 81b is further configured three-dimensionally so as to entirely cover the periphery of the second insert member 83, except for the peripheral side facing the intermediate cover part 81c. The second cover part 81b has a through-hole 81d formed for inserting an Allen key or another such tool when attaching or removing the pedal 53. The intermediate cover part 81c is formed integrally so as to allow the first and second cover parts 81a and 81b to be smoothly connected.

The communicating part 89 is configured from a vent hole (one example of a ventilation part) 89a that is not visible from the outside and that is provided in the intermediate cover part 81c of the second shell member 81 in the present embodiment. The vent hole 89a can be formed in advance, and can be formed by metal forming and then machining.

The first and second shell members 80 and 81 are formed as shown in FIGS. 6 and 7, respectively, by cutting a prepreg made of carbon fiber into the desired shape, and then using a metal die split into the desired shape to hot-form the prepreg so that the prepreg bends into a U shape in cross section, for example.

The adjustment member 57 is screwed into the first insert member 82 of the left crank 52 to adjust ball contact. The adjustment member 57 has an internal thread 57a that is threaded over an external thread 90d, and the adjustment member 57 can be fixed to the first insert member 82 by a fastening bolt that encloses a slit (not shown). The adjustment member 57 is fixed to the first insert member 82 after ball contact is adjusted with the adjustment member 57.

When the left crank 52 is formed, the first and second insert members 82 and 83 are brought to the desired position on the second shell member 81 and fixed in place with an adhesive or the like. The internal peripheral surface of the first shell member 80 and the external peripheral surface of the second shell member 81 are then coated with an epoxy-based thermosetting adhesive, for example, as shown in FIG. 8, and the members are inserted into a metal die. The two members are then pressure-bonded and heated, forming the left crank 52 as shown in FIG. 8. The internal pressure of the internal space 84 does not increase during this pressure bonding because the air in the internal space 84 escapes through the vent hole 89a. As a result, the adhesive can be prevented from leaking to the exterior as a result of an increase in internal pressure. A suitable number of prepregs are then heat-bonded alternately between the external surface and the inner surface of the left crank 52 formed into the desired shape. These prepregs constitute a sheet-shaped surface member 91 cut into the desired shape in advance, the purpose of which is to decorate and to reinforce. A surface member 91 having an improved design thereby covers the left crank 52, and the vent hole 89a is closed off. The surface member 91 is formed over the entire surface of the left crank 52, as shown in FIGS. 2, 4, and 8. The through-holes 80d, 80e of the first shell member 80 and the through-holes 81d, 81e of the second shell member 81 remain open.

When the crank part 41 having this configuration is mounted on the hanger 29, the bearings 63 and 64 and the cover members 65 and 66 are first mounted in advance on the left and right bearing housings 60 and 61. The connecting member 62 is also mounted on either of the bearing housings 60 and 61. The bearing housings 60 and 61 are then screwed into the internal threads 29a and 29b of the hanger 29 with a torque in a specific range. Next, the right crank 51 to which the crank axle 54 is integrally fixed is inserted from the side facing the bearing housing 61. The adjustment member 57 is then screwed in up to the base of the protrusion 90c of the left crank 52. The fastening torque is reduced at this time, making the adjustment member 57 capable of rotating. After the adjustment member 57 is screwed in, the left crank 52 is mounted at a phase of rotation 180 degrees opposite of the right crank 51, and is fixed in place by the fixing bolt 59.

The adjustment member 57 is turned in the loosening direction in this state. The adjustment member 57 is then capable of applying pressure to the inner ring 63a of the bearing 63 via the cover member 65 to adjust ball contact. When the ball contact is completely adjusted, the fastening bolt is tightened to enclose the width of the slit, and the adjustment member 57 is fixed to the protrusion 90c. The adjustment member 57 is thereby secured, and the adjusted ball contact is not likely to change until the next time the left crank 52 is attached or removed.

The right crank 51 is configured from the first and second shell members 73 and 74, and the first and second insert members 75 and 76 with the communicating part 78. The left crank 52 is configured from the first and second shell members 80 and 81, and the first and second insert members 82 and 83 with the communicating part 89. The cranks 51 and 52 are provided with the communicating parts 78 and 89 to communicate the internal spaces 77, and 84 between the bonded shell members 73, 74 and 80, 81 with the exterior. The internal pressure in the internal spaces 77 and 84 therefore does not increase when the shell members are bonded. Therefore, the adhesive can be prevented from leaking to the exterior as a result of an increase in internal pressure.

In the right crank 51, the first connecting hole 85a is also covered by the first shell member 73 and is not exposed to the exterior even if the crank axle 54 is press-fitted and fixed into the first connecting hole 85a of the first insert member 75 from the outside. Therefore, the design of the right crank 51 can be improved even for the right crank 51 to which the crank axle 54 is fixed.

Additionally, since the first and second shell members 73 and 74 cover the extended part 87, which extends in the direction from the crank axle connecting portion R1 toward the pedal connecting portion R2 along the main crank portion R3, the first and second shell members 73 and 74 can be bonded to the extended part 87. Consequently, the bonded surface area between the insert member and the shell members can be increased so as to make it more difficult for the first shell member 73 to become displaced relative to the first insert member 75 when the crank is pedaled, even if a stress acting to twist the crank develops when the force is transmitted from the pedal connecting portion R2 to the first insert member 75 through the first and second shell members 73 and 74. As a result, the first shell member 73 can be prevented in an effective manner from separating from the first insert member 75.

In the first embodiment, the communicating holes 78 and 89 were provided to the second shell members 74 and 81, respectively, but the communicating holes 78 and 89 can be provided anywhere as long as the internal spaces 77 and 84, respectively, are communicated with the exterior of the crank. The communicating holes 78 and 89 are not limited to being formed in the second shell members 74 and 81, and communicating holes can be provided to any of the first shell members 73 and 80, and the first and second insert members 75 and 76 and 82 and 83.

Figure 9:
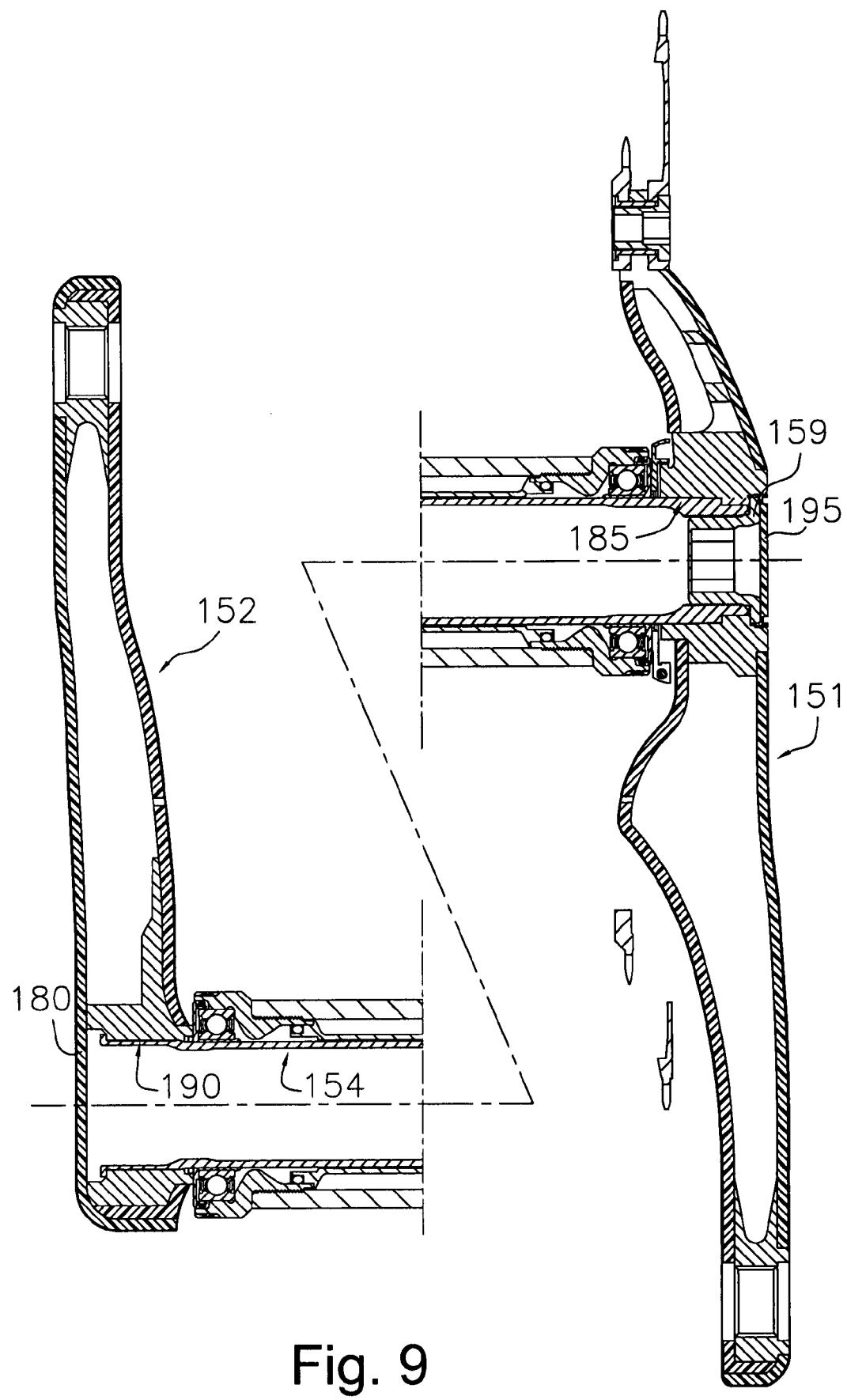
FIG. 9 is a transverse cross sectional view, similar to FIG. 2, of the bicycle crank axle assembly including a sprocket in accordance with another embodiment of the present invention.

Referring now to FIG. 9, a crank unit in accordance with a second embodiment is illustrated. In view of the similarity between the first and second embodiments, the descriptions of the parts of the second embodiment that are identical to the parts of the first embodiment will be omitted for the sake of brevity. In the first embodiment, the crank axle 54 was press-fitted and fixed to the right crank 51, but in this second embodiment, a crank axle 154 is press-fitted and fixed to a left crank 152 as shown in FIG. 9. In this case, a first connecting hole 190 is covered by a first shell member 180 of the left crank 152 and is not exposed to the exterior. A right crank 151 is fixed with fixing bolt 159. A first connecting hole 185 is also sealed by a seal member 195. Thus, left and right end connections at the left and right ends of the crank axle 154 are identical to the opposite end connections of the crank axle 54, i.e., the left end connection of the crank axle 154 is identical to the right end connection of the crank axle 54 and the right end connection of the crank axle 154 is identical to the left end connection of the crank axle 54.

Figure 10:
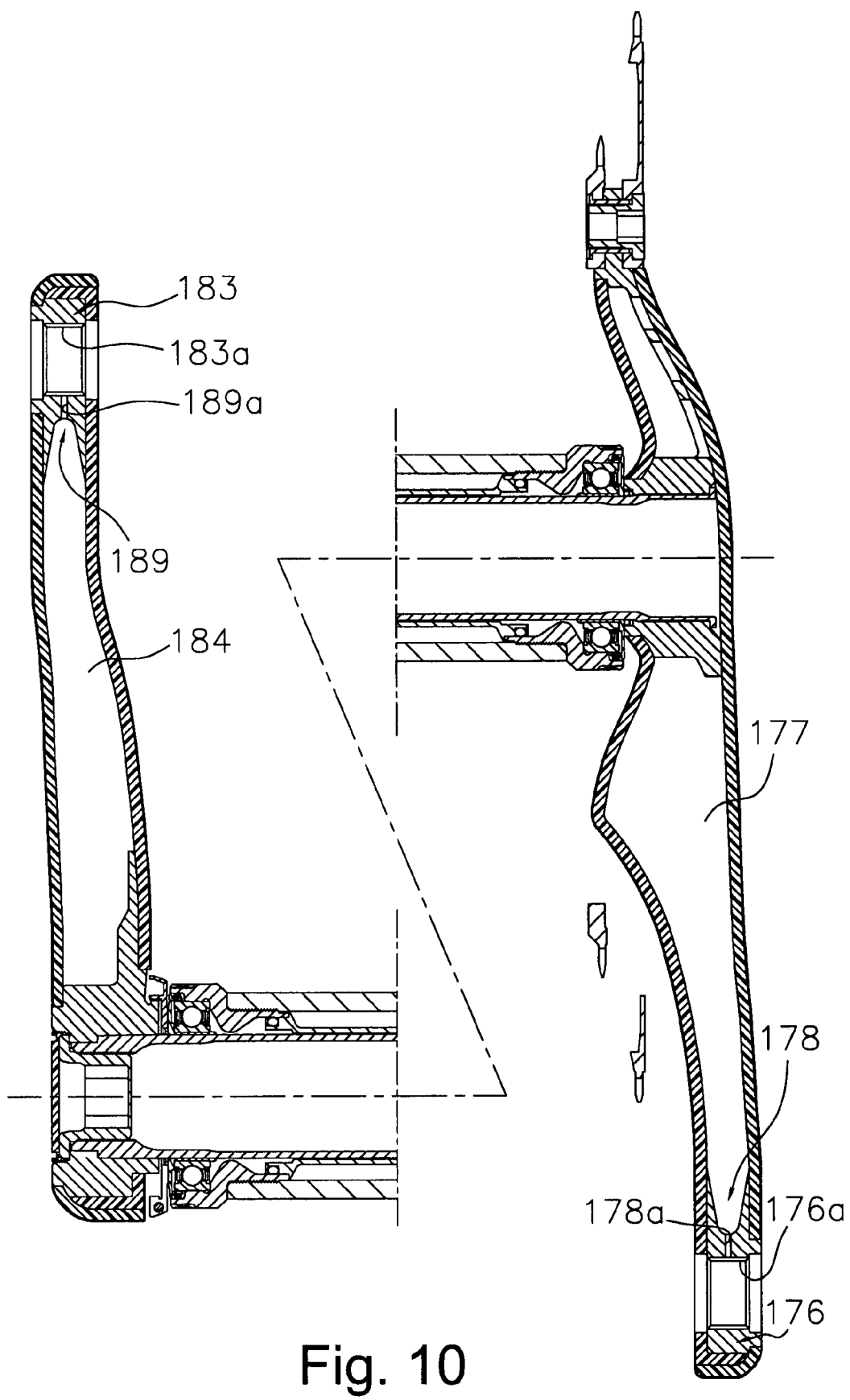
FIG. 10 is a transverse cross sectional view, similar to FIG. 2, of the bicycle crank axle assembly including a sprocket in accordance with still another embodiment of the present invention.

Referring now to FIG. 10, a crank unit in accordance with a third embodiment is illustrated. In view of the similarity between the first and third embodiments, the descriptions of the parts of the third embodiment that are identical to the parts of the first embodiment will be omitted for the sake of brevity. In FIG. 10, the communicating holes 178 and 189 are provided in the form of communicating holes 178a and 189a to the second insert members 176 and 183. The communicating holes 178a, 189a allow the internal spaces 177 and 184 to be communicated with second communicating holes 176a and 183a that are communicated with the exterior. In cases in which the communicating parts are provided to the insert members, the communicating parts may be slits for communicating the internal spaces with the exterior in the border of the shell members.

Figure 11:
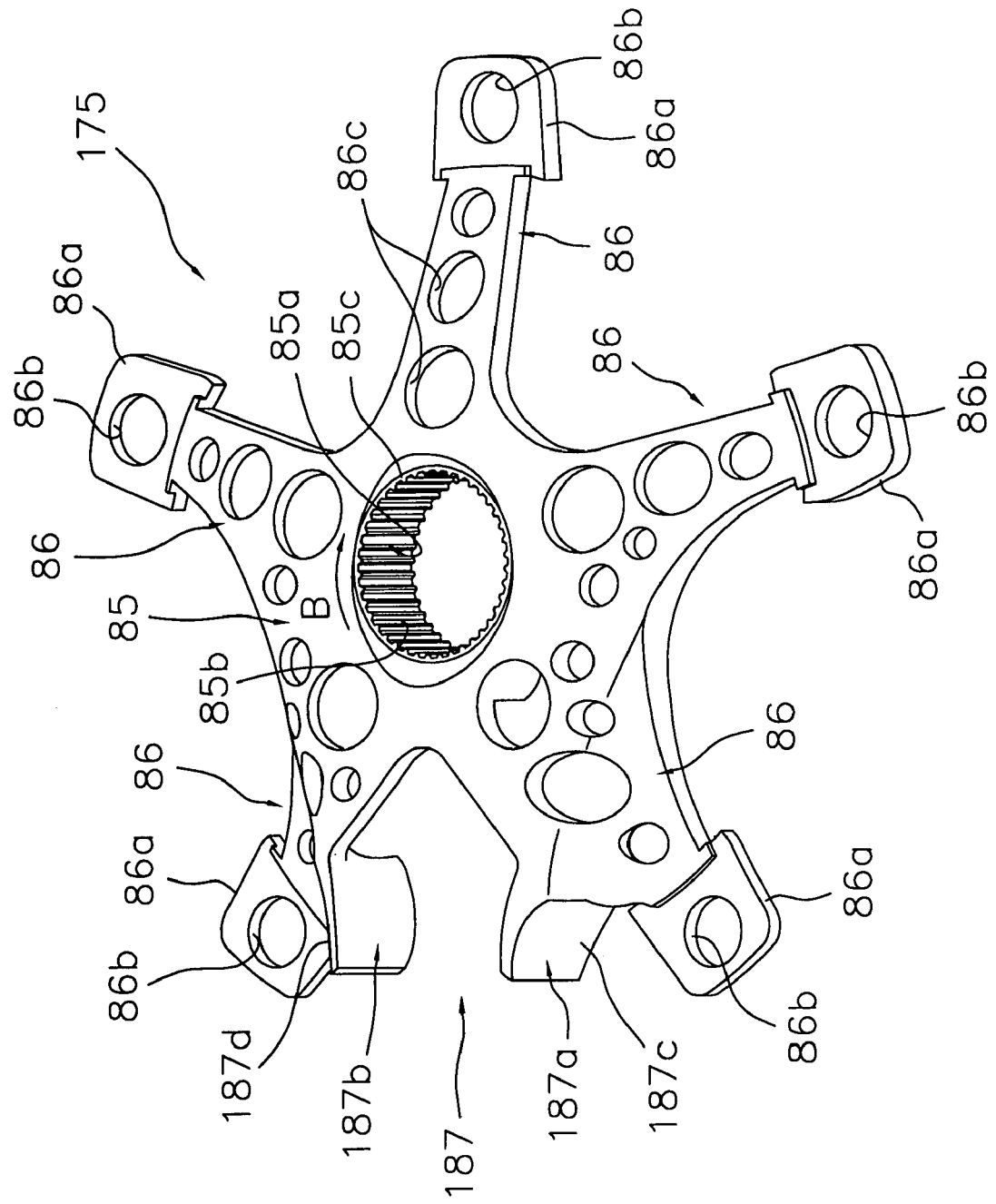
FIG. 11 is a perspective view of an alternate first insert for the right crank arm illustrated in FIG. 5.

Referring now to FIG. 11, an alternate first insert member 175 is illustrated for use in any one of the prior crank units. In view of the similarity between the alternate first insert member 175 and the first insert member 75, the descriptions of the parts that are identical will be omitted for the sake of brevity. Also the parts of the alternate first insert member 175 that are identical to the first insert member 75 will be given the same reference number.

In the first insert member 175, it is also acceptable for an extended part 187 of the first insert member 175 to be plate-shaped, as shown in FIG. 11. Similarly to the first insert member 75, the first insert member 175 is a substantially starfish-shaped member made of an aluminum alloy, magnesium alloy, titanium alloy, or other light metal, preferably an aluminum alloy whose surface is provided with an alumite finish. Thus, similarly to the previously described embodiment, the first insert member 175 includes the axle attaching part 85 disposed in the center, and the five arm parts 86 extending radially in five directions from the axle attaching part 85. In this embodiment, an extended part 187 is arranged between two of the arm parts 86 and extends in the direction from the crank axle connecting portion R1 toward the pedal connecting portion R2 so as to following along the main crank portion R3 similarly to the previously described embodiment.

The first connecting hole 85a is formed in the center of the axle attaching part 85 for fastening the crank axle 54 by press-fitting. Serrations 85b for preventing relative rotation of the crank axle 54 are formed in the internal peripheral surface of the first connecting hole 85a. A flat annular contact surface 85c is formed in the outer end surface of the first connecting hole 85a, and the flange 54b of the crank axle 54 is in contact with this annular contact surface 85c. This contact between the flange 54b and the contact surface 85c allows the crank axle 54 to be easily positioned in the axial direction when the crank axle 54 is fixed by press-fitting. This contact also makes it possible to prevent the axis of the crank axle 54 from being tilted (misaligned) when the crank axle 54 is fixed by press-fitting in the axle-attaching part 85 of the first insert member 175, and to fasten the crank axle 54 to the first insert member 175 with high precision.

Similarly to the previously described embodiment, the sprocket attachment parts 86a are formed at the distal ends of the five arm parts 86 for fastening the sprockets 71 and 72. The sprocket attachment parts 86a are machined into plate shapes. Bolt insertion holes 86b are formed in the sprocket attachment parts 86a, and the hollow attachment bolts 88a and the attachment nuts 88b are inserted through the bolt insertion holes 86b to fasten the sprockets 71 and 72 by conventional methods. The perforated holes 86c are also formed from the axle-attaching part 85 to the five arm parts 86 for weight reduction.

The extended part 187 is configured to extend from between two arm parts 86 toward the second insert member 76, i.e., in the direction from the crank axle connecting portion R1 toward the pedal connecting portion R2 so as to follow along the main crank portion R3, and serves to reinforce an inside surface of the first shell member 73. More specifically, the extended part 187 has a first rib 187a and a second rib 187b arranged between two arm parts 86 of the crank so as to be side by side with respect to the rotational direction of the gear crank arm 58. The first rib 187a is arranged in an intermediate position of the arm part 86 located on the upstream side with respect to the rotational direction in which the gear crank arm 58 is rotated in order to move the bicycle forward (i.e., the rotational direction indicated with the arrow B in FIG. 11). The second rib 187b is arranged in an intermediate position of the arm part 86 located on the downstream side with respect to said rotational direction and is oriented so as to face the first rib 187a. The first rib 187a has a bonding surface 187c and the second rib 87b has a bonding surface 187d. Both bonding surfaces 187c and 187d intersect the rotational direction. The dimensions of the bonding surfaces 187c and 187d in the direction of the crank axle 54 are larger than in the previously described embodiment such that the bonding surfaces 187c and 187d each have a plate-like shape.

With this configuration, since the dimensions of the bonding surfaces 187c and 187d in the direction of the crank axle 54 are larger than in the previously described embodiment, the surface areas of the bonds between the first and second shell members 73 and 74 and the bonding surfaces 187c and 187d can be increased and the bond strength can be increased. Consequently, it is more difficult for the first shell member 73 to become displaced relative to the first insert member 75 when the crank is pedaled, even if a stress acting to twist the crank develops when the force is transmitted from the pedal connecting portion R2 to the first insert member 75 through the first and second shell members 73 and 74. As a result, the first shell member 73 can be prevented in an effective manner from separating from the first insert member 75.

Although the illustrated embodiments illustrates examples in which the invention is applied to the cranks having the crank axle 54 or 154 fastened thereto, the present invention can also be applied to cranks that does not include a crank axle, i.e., cranks to which the crank axle is fastened in a detachable manner. Also while a road bike is illustrated, the cranks of the present invention can be applied to all types of bicycles.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank comprising:
   a crank axle connecting portion;
   a pedal connecting portion configured to be connected to a pedal;
   a main crank portion formed between the crank axle connecting portion and the pedal connecting portion and having a hollowed structure;
   a first insert member arranged in the crank axle connecting portion, the first insert member including an axle attaching part with a crank axle connecting hole extending from an inside facing surface to an outside facing surface and an extended part extending in the direction from the axle attaching part toward the pedal connecting portion along the main crank portion with the extended part directly contacting the hollowed structure of the main crank portion to support the hollowed structure of the main crank portion; and
   a shell member made of a fiber reinforced resin at least partially covering the outside facing surface of the first insert member with the shell member forming the hollowed structure of the main crank portion.

2. The bicycle crank according to claim 1, wherein
   the first insert member is further includes a plurality of arm parts that extend radially from the axle attaching part.

3. The bicycle crank according to claim 2, further comprising
   a second insert member disposed in the pedal connecting portion for connecting the pedal with the second insert member having an inside facing surface and an outside facing surface, and
   the shell member including a first shell member covering the outside facing surfaces of the first and second insert members, and a second shell member covering the inside facing surfaces of the first and second insert members, with the first and second shell members being fixed together to forms an internal space housing the first insert member and the second insert member.

4. The bicycle crank according to claim 1, further comprising
   a hollow crank axle fixedly secured in the connecting hole to form a press-fit connection therebetween with the hollow crank axle and the connecting hole being configured to be only installable into the connecting hole from the outside facing surface of the first insert member.

5. The bicycle crank according to claim 2, wherein
   the extended part of the first insert member includes a first rib extending towards the pedal connecting portion from an intermediate position of a first one of the arm parts along an upstream side of the main crank portion with respect to a rotational direction in which the bicycle crank is rotated in order to move in a forward direction when installed on a bicycle.

6. The bicycle crank according to claim 5, wherein
the extended part of the first insert member further includes a second rib extending towards the pedal connecting portion from an intermediate position of a second one of the arm parts along a downstream side of the main crank portion with respect to the rotational direction in which the bicycle crank is rotated in order to move in the forward direction.

7. The bicycle crank according to claim 6, wherein
the first and second ribs have bonding surfaces that face in opposite directions and intersect with a circle that is centered on a rotational axis of the crank axle connecting hole.

8. The bicycle crank according to claim 3, further comprising
a communicating part communicating the internal space with an exterior area.

9. The bicycle crank according to claim 4, wherein
the crank axle has a flange contacting the outside facing surface of the first insert member adjacent to the connecting hole.

10. The bicycle crank according to claim 1, wherein
the shell member entirely covers the connecting hole on the outside facing surface of the first insert member.

11. The bicycle crank according to claim 10, wherein
the shell member including a first shell member covering the outside facing surface of the first insert member, and a second shell member at least partially covering the inside facing surface of the first insert member, with the first and second shell members being fixed together to forms an internal space housing the first insert member.

12. The bicycle crank according to claim 11, further comprising
a second insert member disposed in the pedal connecting portion for connecting the pedal with the second insert member having an inside facing surface and an outside facing surface, and the first and second shell members at least partially covering the inside and outside facing surfaces of the second insert member.

13. The bicycle crank according to claim 1, wherein
the shell member is a preformed member such that shell member covers at least the outside facing surface of the first insert member.

* * * * *